United States Patent [19]

Nagata

[11] Patent Number: 5,321,983
[45] Date of Patent: Jun. 21, 1994

[54] METHOD OF CORRECTING TEMPERATURE CHARACTERISTICS OF FLOW VELOCITY SENSOR

[75] Inventor: Mitsuhiko Nagata, Kanagawa, Japan

[73] Assignee: Yamatake-Honeywell Co., Ltd., Tokyo, Japan

[21] Appl. No.: 985,576

[22] Filed: Dec. 3, 1992

[30] Foreign Application Priority Data

Dec. 4, 1991 [JP] Japan .................................. 3-347659

[51] Int. Cl.$^5$ ................................................ G01F 1/68
[52] U.S. Cl. .............................. 73/204.18; 73/204.26
[58] Field of Search ........... 73/204.16, 204.18, 204.19, 73/204.26, 204.27

[56] References Cited

U.S. PATENT DOCUMENTS

| | | | |
|---|---|---|---|
| 3,938,384 | 2/1976 | Blair | 73/204.27 |
| 4,693,116 | 9/1987 | Miura et al. | 73/204.16 |
| 4,825,693 | 5/1989 | Bohrer et al. | 73/204.27 |
| 5,036,701 | 8/1991 | Graff | 73/204.27 |

FOREIGN PATENT DOCUMENTS

60-142268  7/1985  Japan .

*Primary Examiner*—Herbert Goldstein
*Attorney, Agent, or Firm*—Blakely, Sokoloff, Taylor & Zafman

[57] ABSTRACT

In a method of correcting temperature characteristics of a flow velocity sensor, the flow velocity sensor having a heater and a pair of temperature-measuring sensors arranged on both sides thereof is set such that the temperature-measuring sensors are located at upper and lower vertical positions along the flow of a target gas to be measured. A difference in self-heat amount is set between one of the temperature-measuring sensors, located on an upstream side of the flow of the gas, and the other temperature-measuring sensor located on a downstream side of the flow of the gas.

9 Claims, 7 Drawing Sheets

METHOD OF CORRECTING TEMPERATURE CHARACTERISTICS OF FLOW VELOCITY SENSOR

BACKGROUND OF THE INVENTION

The present invention relates to a method of correcting the temperature characteristics of a flow velocity sensor for measuring the flow rate of a gas.

Flow velocity sensors having various structures have been proposed to measure the flow rate of a gas. For example, as one of such sensors, a thermal flow velocity sensor based on the semiconductor manufacturing techniques is disclosed in Japanese Patent Laid-Open No. 60-142268.

Figure 9:
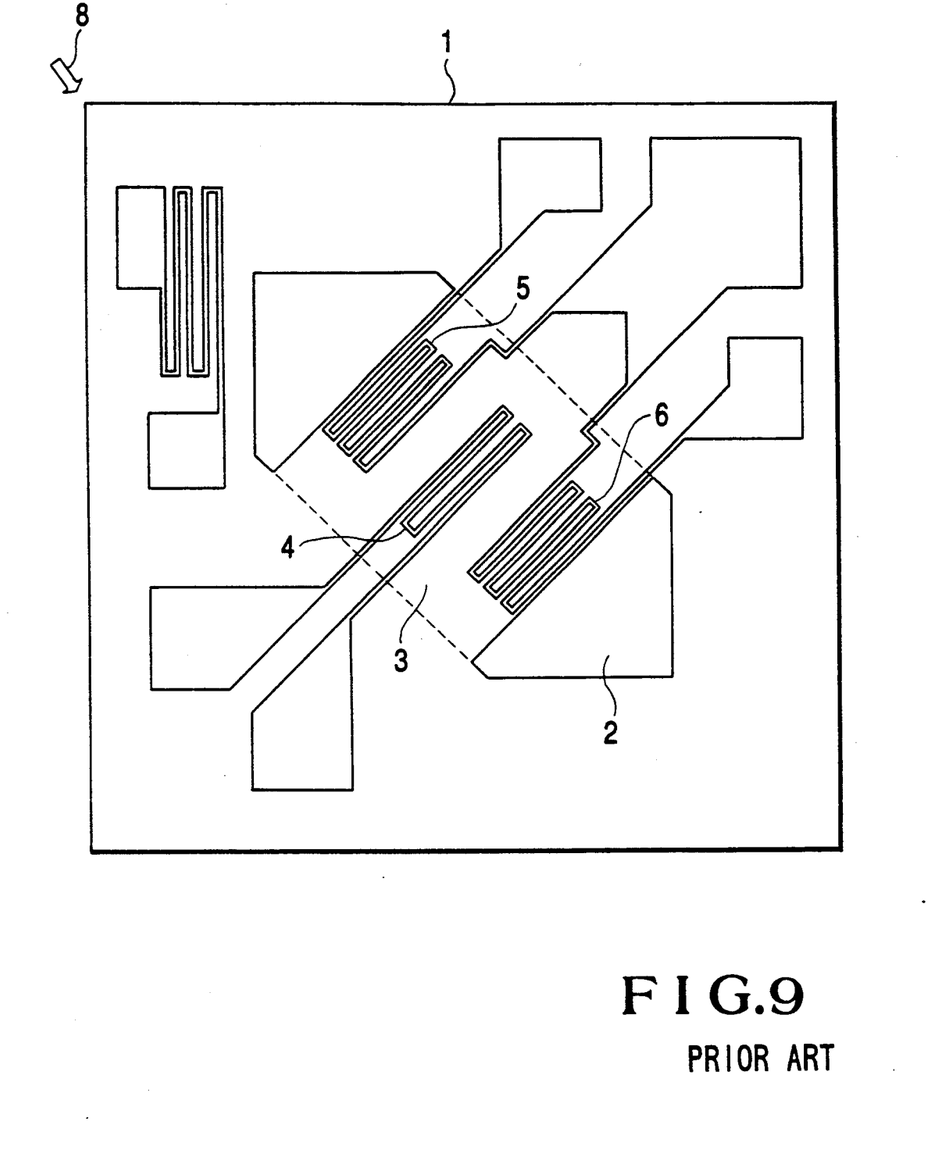
FIG. 9 is a plan view showing the arrangement of a conventional flow velocity sensor.

As shown in FIG. 9, in this thermal flow velocity sensor, a thin film bridge portion 3 is formed on the surface of a semiconductor substrate 1 through a concave gap portion 2 for thermally insulating the bridge portion 3 from the substrate 1. A heater element 4 is formed at a middle portion of the surface of the bridge portion 3, and temperature-measuring resistive elements 5 and 6 for heat detection are formed on both sides of the heater element 4 in such a manner that the elements 4, 5, and 6 float above the substrate 1.

When a current is supplied to the heater element 4 of the flow velocity sensor having such an arrangement to generate heat, and a gas moves from a direction 8 indicated by an arrow while the sensor is placed in the flow of the gas, the temperature-measuring resistive element 5 on the upstream side is cooled by the flow of the gas to cause a decrease in temperature, whereas the temperature of temperature-measuring resistive element 6 on the downstream side is increased by the gas heated by the heater element 4.

As a result, a temperature difference occurs between the upstream and downstream temperature-measuring resistive elements 5 and 6, and their resistances change. For this reason, if the upstream and downstream temperature-measuring resistive elements 5 and 6 are incorporated in a Wheatstone bridge circuit, and changes in resistance are converted into voltages, a voltage output corresponding to the flow velocity of the gas can be obtained. As a result, the flow velocity of the gas can be detected. The flow rate of the gas can be immediately obtained by multiplying the detected flow velocity of the gas by the cross-sectional area of a portion through which the gas flows.

If, however, the flow velocity sensor having the above arrangement is vertically arranged to measure the flow rate of a gas with the upstream and downstream temperature-measuring resistive element 5 and 6 being respectively placed at upper and lower positions, the elements 5 and 6 are influenced by natural convection. More particularly, if the ambient temperature is lower than a normal temperature such as room temperature, since the density of a target gas to be measured is increased, heat generated by the heater element 4 tends to be easily transferred to the temperature-measuring resistive elements 5 and 6, and the upstream temperature-measuring resistive element 5 is heated more. For this reason, the output from the flow velocity sensor shifts to the negative side from a measurement value at a normal temperature such as room temperature with no flow of the gas.

In contrast to this, if the ambient temperature is higher than a normal temperature, since the density of a target gas is decreased, heat generated by the heater element 4 tends not to be easily transferred to the temperature-measuring resistive elements 5 and 6, and the upstream temperature-measuring resistive element 5 is cooled. For this reason, the output from the flow velocity sensor shifts to the positive side from a measurement value at a normal temperature such as the room temperature with no flow of the gas. Consequently, stable measurement cannot be performed.

SUMMARY OF THE INVENTION

It is an object of the present invention to provide a method of correcting the temperature characteristics of a flow velocity sensor which can stably measure the flow rate of a gas without being influenced by natural convection caused by changes in ambient temperature.

In order to achieve the above object, according to the present invention, there is provided a method of correcting temperature characteristics of a flow velocity sensor, comprising the steps of setting the flow velocity sensor having a heater and a pair of temperature-measuring sensors arranged on both sides thereof such that the temperature-measuring sensors are located at upper and lower vertical positions along a flow of a target gas to be measured, and setting a difference in self-heat amount between one of the temperature-measuring sensors, located on an upstream side of the flow of the gas, and the other temperature-measuring sensor located on a downstream side of the flow of the gas.

DESCRIPTION OF THE PREFERRED EMBODIMENTS

Embodiments of the present invention will be described in detail below with reference to the accompanying drawings.

Figure 1:
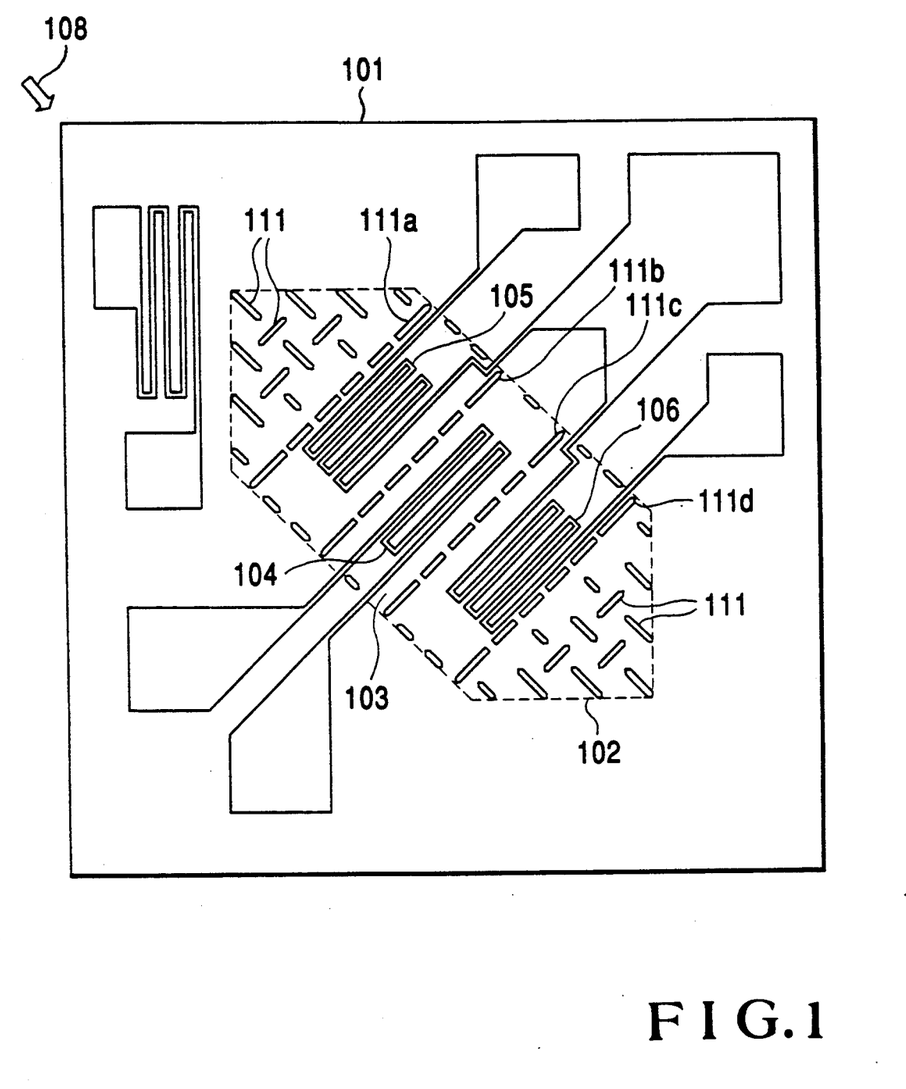
FIG. 1 is a plan view showing the arrangement of a flow velocity sensor according to the present invention.

FIG. 1 shows the arrangement of a flow velocity sensor to explain a method of correcting the temperature characteristics of the flow velocity sensor according to the present invention. Referring to FIG. 1, a thin film diaphragm 103 is formed at a middle portion of the surface of a semiconductor substrate 101 so as to be thermally insulated from the semiconductor substrate 101 through a gap portion 102. A heater element 104 is formed at a middle portion of the diaphragm 103. In addition, temperature-measuring resistive elements 105 and 106, which are independent of each other and have the same resistance, are formed on both sides of the heater element 104.

A large number of slits 111 are formed in the surface of the semiconductor substrate 101 to etch the semiconductor substrate 101. For example, peripheral portions of the heater element 104 and the temperature-measuring resistive elements 105 and 106 are anisotropically etched through the large number of fine slits 111 formed in the surface of the semiconductor substrate 101 so as to form the gap portion 102 having an inverted trapezoidal air space therein. The diaphragm 103 is isolated from the semiconductor substrate 101 in the form of a diaphragm and is supported above the semiconductor substrate 101 while the heater element 104 and the temperature-measuring resistive elements 105 and 106 formed on both sides of the heater element 104 are thermally insulated from the semiconductor substrate 101.

Reference numerals 111a to 111d denote slit portions consecutively formed in the diaphragm 103 from the upstream side to the downstream side so as to be located before and after the upstream temperature-measuring resistive element 105, the heater element 104, and the downstream temperature-measuring resistive element 106 and communicate with the gap portion 102. Note that reference numeral 108 denotes an arrowhead direction indicating the direction of the flow of a gas.

For the sake of clear understanding of the principle of a method of correcting the temperature characteristics of the flow velocity sensor according to the present invention, a method of measuring the flow rate of a gas by using the flow velocity sensor will be described below.

Assume that a current is supplied to the heater element 104 to generate heat, and that a gas moves in the arrowhead direction 108 when the sensor is placed in the flow of the gas. In this case, the upstream temperature-measuring resistive element 105 is cooled by the flow of the gas to cause a decrease in temperature, whereas the temperature of the downstream temperature-measuring resistive element 106 is increased. Consequently, a temperature difference occurs between the upstream and downstream temperature-measuring resistive elements 105 and 106, and their resistances change. If, therefore, the temperature-measuring resistive elements 105 and 106 are incorporated in a Wheatstone bridge circuit, and changes in resistance are converted into voltages, a voltage output corresponding to the flow velocity of the gas can be obtained. As a result, the flow velocity of the gas can be detected, and the flow rate can be measured.

Figure 2:
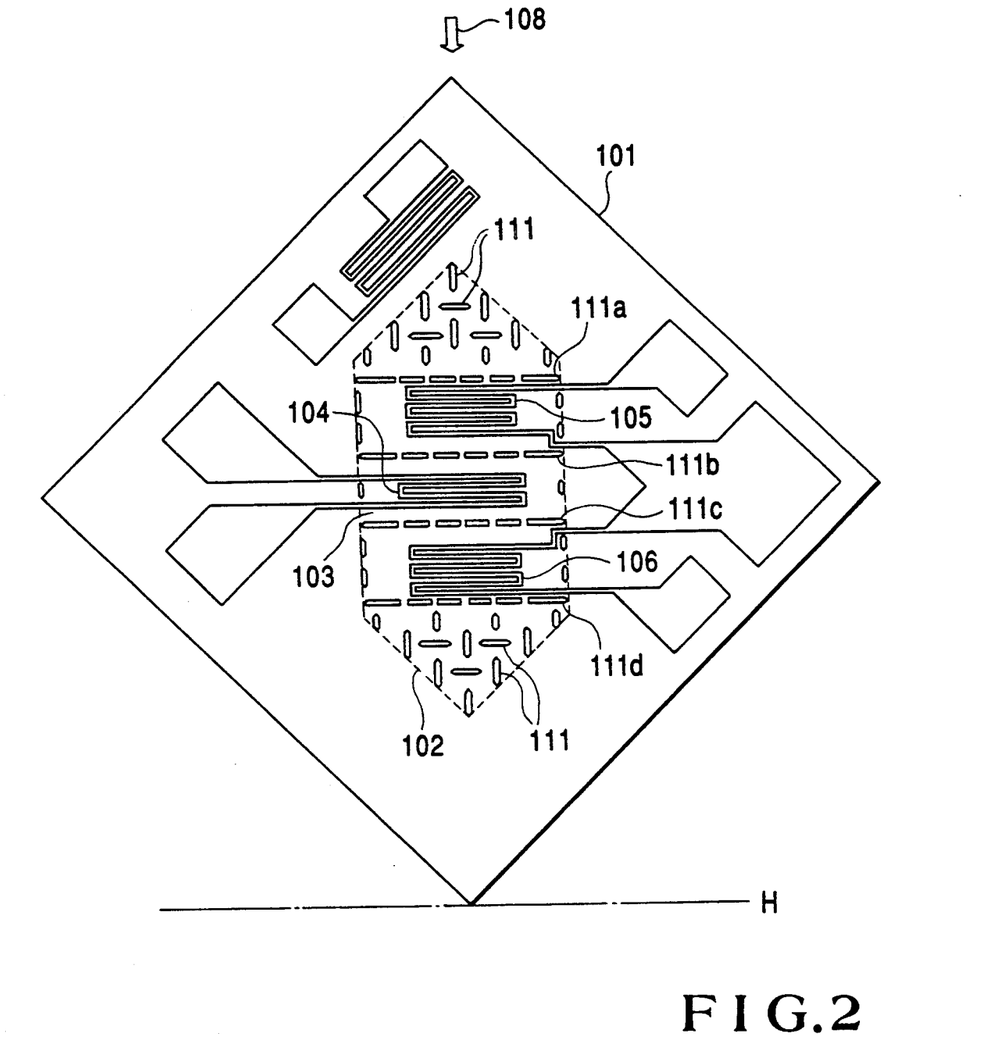
FIG. 2 is a view showing the flow velocity sensor vertically arranged to explain a method of correcting the temperature characteristics of the flow velocity sensor according to an embodiment of the present invention.

If, however, the flow velocity sensor is arranged in a direction vertical to a horizontal line H to measure the flow rate of a gas flowing from the arrowhead direction 108 with the temperature-measuring resistive elements 105 and 106 being respectively located at the upper and lower positions, the flow velocity sensor is influenced by natural convection as follows. When the ambient temperature is lower than a normal temperature such as room temperature, since the density of a target gas is increased, heat generated by the heater element 104 tends to be easily transferred to the upstream and downstream temperature-measuring resistive elements 105 and 106, and the upstream temperature-measuring resistive element 105 is heated more. As a result, the output from the flow velocity sensor shifts to the negative side even in a state wherein there is no flow of the gas.

Figure 3:
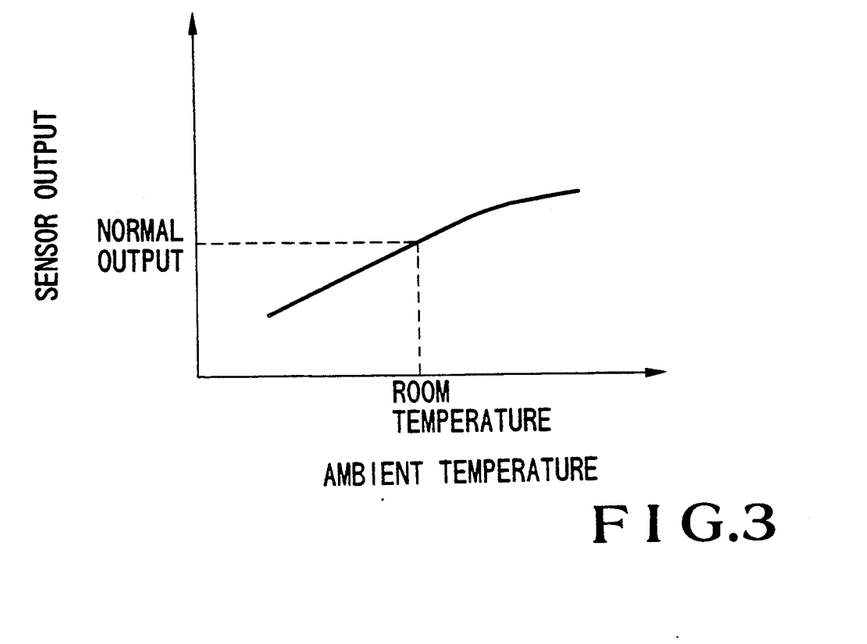
FIG. 3 is a graph showing the output characteristics of the flow velocity sensor arranged in the vertical direction.

In contrast to this, when the ambient temperature is higher than a normal temperature such as room temperature, since the density of the target gas is decreased, heat generated by the heater element 104 tends not to be easily transferred to the upstream and downstream temperature-measuring resistive elements 105 and 106, and the temperature of the upstream temperature-measuring resistive element 105 is not easily increased. For this reason, the output from the flow velocity sensor shifts to the positive side even in a state wherein there is no flow of the gas. Consequently, stable measurement cannot be performed. FIG. 3 shows this output from the flow velocity sensor.

Figure 4:
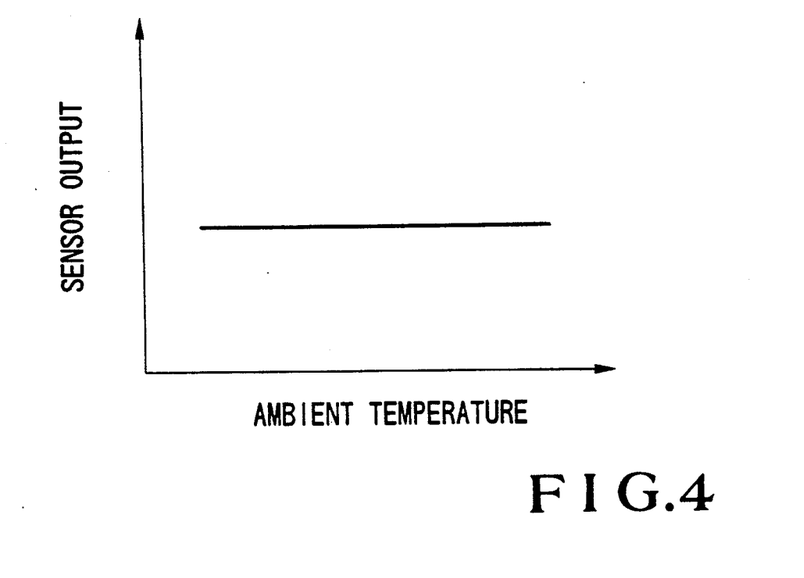
FIG. 4 is a graph showing the ideal output characteristics of the flow velocity sensor arranged in the horizontal direction.

As a comparative example of measurement, measurement of a zero flow rate is performed while the flow velocity sensor in FIG. 1 is arranged in a horizontal position. In a flow velocity sensor which has undergone ideal matching, changes in ambient temperature have no influence on measurement, and a stable zero output is always obtained. FIG. 4 shows such a case.

In this case, if, for example, a temperature increase caused by self-heat of the downstream temperature-measuring resistive element 106 is set to be higher than a temperature increase by self-heat of the upstream temperature-measuring resistive element 105 by about 0.5° C., the states of heat dissipation from the upstream and downstream temperature-measuring resistive elements 105 and 106 change when the ambient temperature changes. If the ambient temperature is higher than a normal temperature such as room temperature, the heat conductivity of the target gas is increased, and the difference in heat dissipation rate between the downstream temperature-measuring resistive element 106 and the upstream temperature-measuring resistive element 105 is increased.

Figure 5:
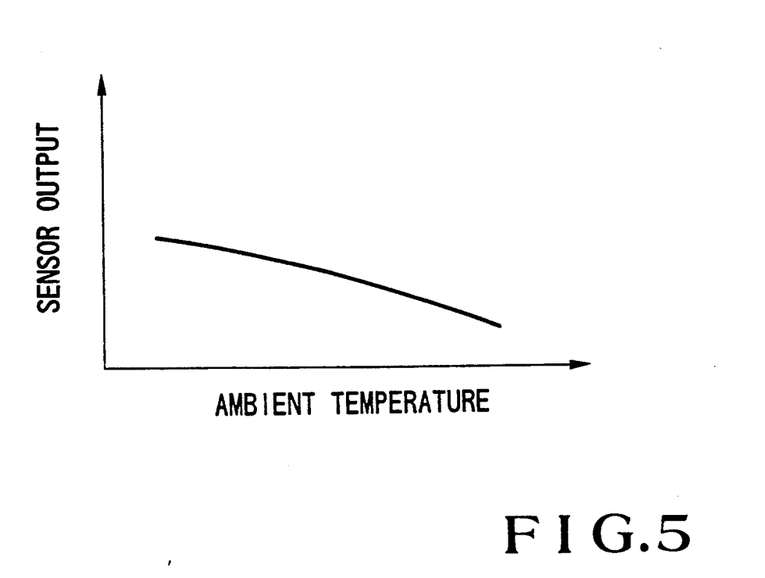
FIG. 5 is a graph showing the output characteristics of the flow velocity sensor arranged in the horizontal direction.

If the ambient temperature is lower than a normal temperature such as room temperature, the heat conductivity of the target gas is decreased, the difference in heat dissipation rate between the downstream temperature-measuring resistive element 106 and the upstream temperature-measuring resistive element 105 is reduced. In this scheme, therefore, if a zero flow rate is measured by the flow velocity sensor arranged in a horizontal position, the output is shifted to the positive side in advance but is shifted to the negative side with an increase in ambient temperature. FIG. 5 shows such a case.

Figure 6:
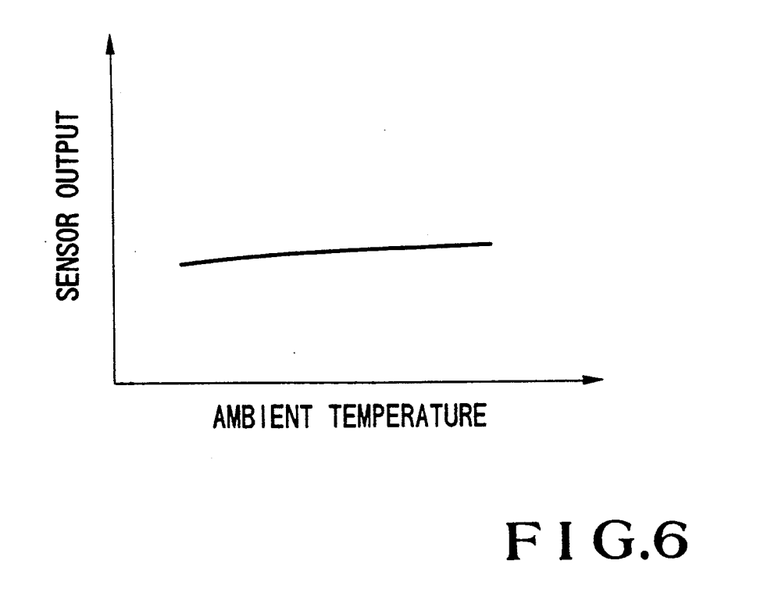
FIG. 6 is a graph showing the output characteristics of the flow velocity sensor which are obtained by the method of correcting the temperature characteristics of the flow velocity sensor according to the embodiment of the present invention.

Assume that this phenomenon is applied in such a manner that a temperature increase caused by self-heat of the downstream temperature-measuring resistive element 106 of the flow velocity sensor arranged in a vertical position is always set to be higher than a temperature increase caused by self-heat of the upstream temperature-measuring resistive element 105 by about 0.5° C. In this case, errors caused by changes in heat transfer rate due to natural convection can be canceled by changes in heat dissipation state due to changes in heat conductivity. That is, in order to cancel the slope of the sensor output characteristic curve shown in FIG. 3, the flow velocity sensor arranged in a horizontal position is set in advance to have a sensor output characteristic curve having the same magnitude as that of the curve in FIG. 3 but has an inverse slope, as shown in FIG. 5. When the flow velocity sensor is arranged in a vertical position, the slopes of the curves shown in FIGS. 3 and 5 are canceled by each other to obtain the sensor output characteristic curve shown in FIG. 6.

Note that a difference in self-heat amount between the upstream and downstream temperature-measuring resistive elements 105 and 106 can be set by properly controlling a bias current supplied to the upstream temperature-measuring resistive element 105 or the downstream temperature-measuring resistive element 106.

Other methods of setting a difference in self-heat amount between the upstream and downstream temperature-measuring resistive elements 105 and 106 are: a method of using different materials for the upstream and downstream temperature-measuring resistive elements 105 and 106; a method of using thin film elements for the heater element 104 and the temperature-measuring resistive elements 105 and 106; a method of setting a difference in thickness between these thin films; and a method of setting a difference in line width between the upstream and downstream temperature-measuring resistive elements 105 and 106. That is, a difference in self-heat amount can be set by properly forming upstream and downstream temperature-measuring resistive elements to have difference physical forms.

Figure 7:
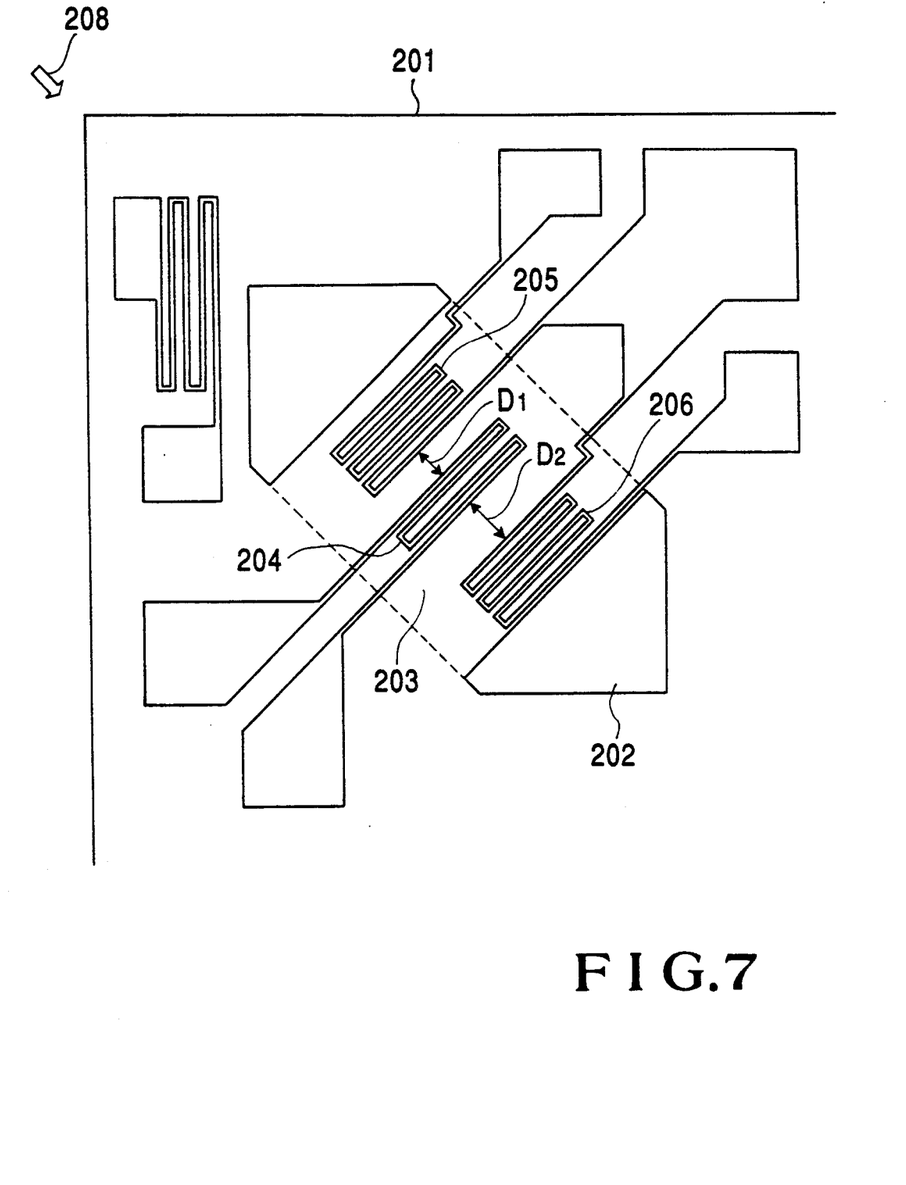
FIG. 7 is a plan view showing the arrangement of a flow velocity sensor to explain a method of correcting the temperature characteristics of the flow velocity sensor according to another embodiment of the present invention.

FIG. 7 shows the arrangement of a flow velocity sensor to explain a method of correcting the temperature characteristics of the flow velocity sensor according to another embodiment of the present invention.

In the conventional flow velocity sensor, for example, a distance $D_1$ between the heater element 4 and the upstream temperature-measuring resistive element 5 is set to be 90 $\mu$m; and a distance $D_2$ between the heater element 4 and the downstream temperature-measuring resistive element 6, 90 $\mu$m (see FIG. 9). In this embodiment, for example, a distance $D_1$ between a heater element 204 and an upstream temperature-measuring resistive element 205 is set to be 60 $\mu$m; and a distance $D_2$ between the heater element 204 and a downstream temperature-measuring resistive element 206, 90 $\mu$m so as to set a difference between a temperature increase of the upstream temperature-measuring resistive element 205, caused by heat received from the heater element 204, and that of the downstream temperature-measuring resistive element 206.

Figure 8:
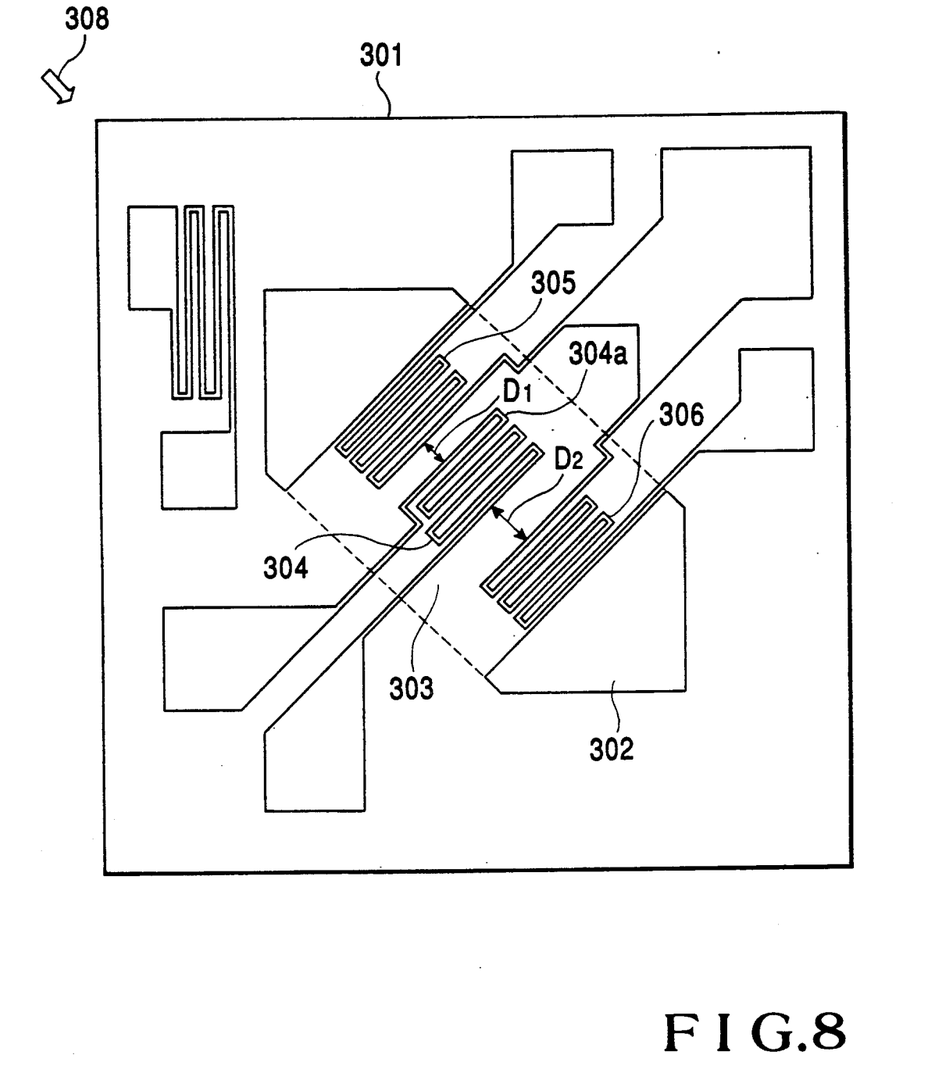
FIG. 8 is a plan view showing the arrangement of a flow velocity sensor to explain a method of correcting the temperature characteristics of a flow velocity sensor according to still another embodiment of the present invention.

FIG. 8 shows the arrangement of a flow velocity sensor to explain a method of correcting the temperature characteristics of the flow velocity sensor according to still another embodiment of the present invention.

In this embodiment, an upstream temperature-measuring resistive element 305 and a downstream temperature-measuring resistive element 306 are symmetrically arranged, while a heater element 304 is deformed to have a deformed portion located close to the upstream temperature-measuring resistive element 305, thus setting a difference between a temperature increase of the upstream temperature-measuring resistive element 305, caused by heat received from the heater element 304, and that of the downstream temperature-measuring resistive element 306. Similar to the above embodiment, in this case, a distance $D_1$ between the heater element 304 and the upstream temperature-measuring resistive element 305 is set to be 60 $\mu$m; and a distance $D_2$ between the heater element 304 and the downstream temperature-measuring resistive element 306, 90 $\mu$m.

In each embodiment described above, the heater element and the upstream and downstream temperature-measuring resistive elements are formed by conductive thin films. However, the present invention is not limited to this. It is apparent that even if these elements are constituted by, e.g., wires having circular or rectangular cross-sections, the same effects as those described above can be obtained.

As has been described above, according to the method of correcting the temperature characteristics of a flow velocity sensor according to the present invention, when the flow rate of a gas is measured by the flow velocity sensor vertically arranged with its temperature-measuring sensors being arranged at upper and lower positions, measurement of the flow rate of the gas is not influenced by changes in ambient temperature, and a stable sensor output can always be obtained.

What is claimed is:

1. A method of correcting temperature characteristics of a flow velocity sensor, comprising the steps of:
    setting a flow velocity sensor having a heater and a pair of temperature-measuring sensors arranged on both sides thereof such that said temperature-measuring sensors are located at upper and lower vertical positions along a flow of a target gas to be measured; and
    always setting regardless of ambient temperature such that self-heat amount of one of said temperature-measuring sensors located on a downstream side of the flow of the gas is larger than that of the other temperature-measuring sensor located on an upstream side of the flow of the gas by a predetermined amount to thereby cause said downstream sensor to be at a higher temperature than the upstream sensor at zero flow rate by a predetermined amount regardless of ambient temperature in order to cancel errors caused by changes in heat conductivity due to natural convection, the changes in heat transfer being related to changes of the ambient temperature.

2. A method according to claim 1, wherein the step of setting the difference in self-heat amount comprises the step of supplying different bias currents to said temperature-measuring sensors on the upstream and downstream sides, respectively.

3. A method according to claim 1, wherein the step of setting the difference in self-heat amount comprises the step of forming said pair of temperature-measuring sensors to have difference physical forms.

4. A method according to claim 1, wherein the step of setting the difference in self-heat amount comprises the step of using different materials for said pair of temperature-measuring sensors.

5. A method according to claim 1, wherein one of said temperature-measuring sensors on the downstream side is located at said lower vertical position along the flow of the target gas.

6. A method of correcting temperature characteristics of a flow velocity sensor, comprising the steps of:

setting said flow velocity sensor having a heater and a pair of temperature-measuring sensors arranged on both sides thereof such that said temperature-measuring sensors are located at upper and lower vertical positions along a flow of a target gas to be measured; and always setting regardless of ambient temperature such that a temperature increase of one of said temperature-measuring sensors located on a downstream side of the flow of the gas is larger than that of the other temperature-measuring sensor located on an upstream side of the flow of the gas by a predetermined amount to thereby cause said downstream sensor to be at a higher temperature than the upstream sensor at zero flow rate by a predetermined amount regardless of ambient temperature in order to cancel errors caused by changes in heat conductivity due to natural convection, the temperature increase being caused by heat received from said heater, the changes in heat transfer being related to changes of the ambient temperature.

7. A method of according to claim 6, wherein the step of setting the difference in temperature increase comprises the step of setting said temperature-measuring sensors on the upstream and downstream sides at different distances from said heater.

8. A method according to claim 6, wherein the step of setting the difference in temperature increase comprises the step of forming said heater to have a shape asymmetrical about a direction in which said temperature-measuring sensors on the upstream and downstream sides are arranged.

9. A method according to claim 6, wherein one of said temperature-measuring sensors on the downstream side is located at said lower vertical position along the flow of the target gas.

* * * * *